UNITED STATES PATENT OFFICE.

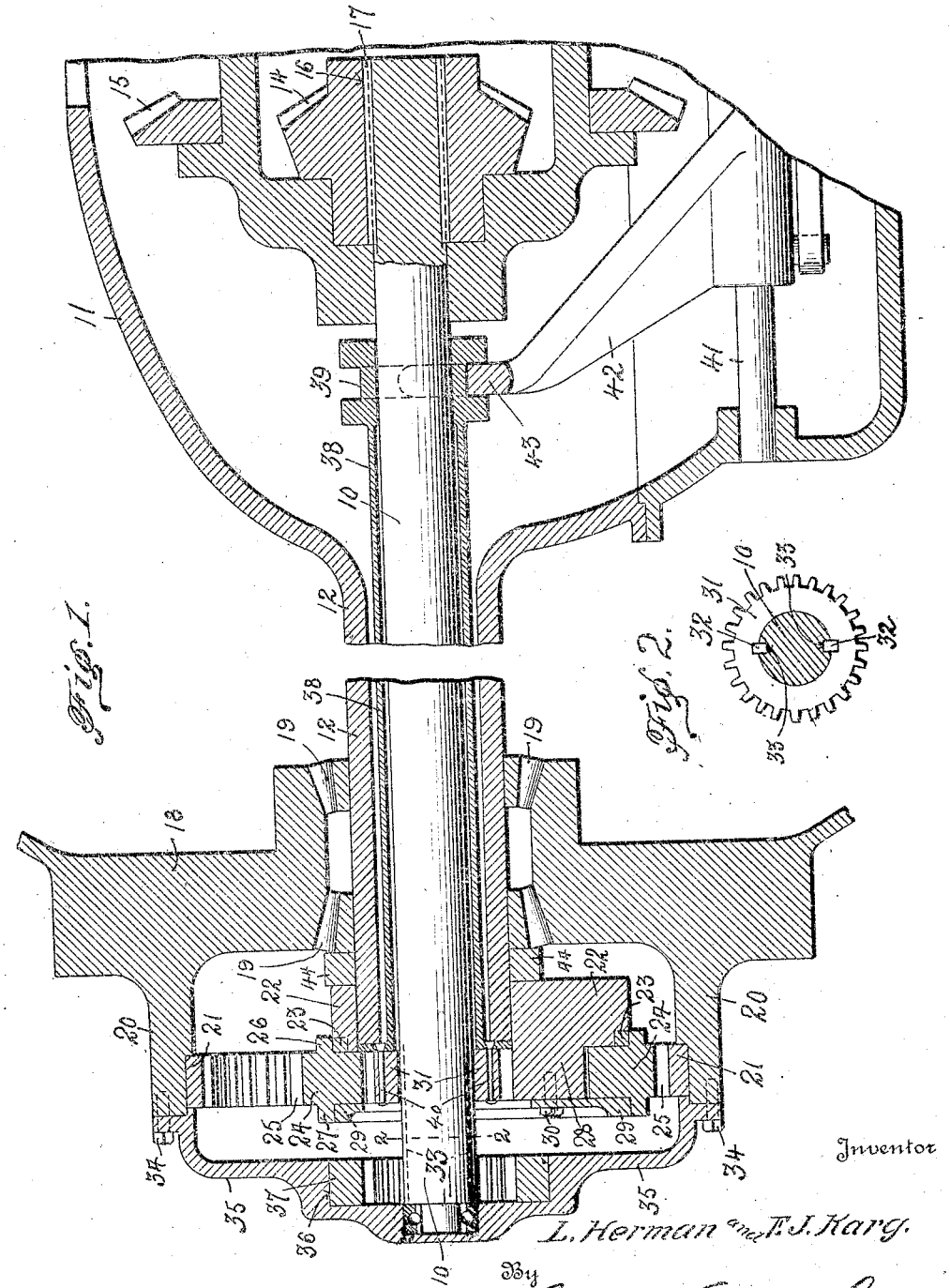

LEO HERMAN AND FRANK J. KARG, OF AKRON, OHIO.

CHANGE-SPEED GEARING.

1,392,157.
Specification of Letters Patent.
Patented Sept. 27, 1921.

Application filed November 26, 1920. Serial No. 426,640.

*To all whom it may concern:*

Be it known that we, LEO HERMAN and FRANK J. KARG, citizens of the United States, residing at Akron, in the county of Summit and State of Ohio, have invented certain new and useful Improvements in a Change-Speed Gearing, of which the following is a specification.

This invention relates to the class of variable speed driving mechanisms, and has for one of its objects to simplify and improve the construction and increase the efficiency and utility of devices of this character.

Another object of the invention is to provide a device of this character which may be applied without material structural change to motor driven vehicles of various forms, and operative by electricity, gasolene, steam or other power.

Another object of the invention is to provide a device of this character whereby high or low speed may be transmitted to a wheel or other moving element from a drive shaft by simply actuating a shifter lever.

With these and other objects in view, the invention consists in certain novel features of construction as hereinafter shown and described and then specifically pointed out in the claim, and in the drawings illustrative of the preferred embodiment of the invention.

Figure 1 is a longitudinal sectional view of the improved apparatus.

Fig. 2 is a front elevation of the slidable pinion with the shaft in section on the line 2—2 of Fig. 1.

The improved device includes a shaft 10 mounted for rotation within a suitable gear casing 11. The casing 11 is extended at the ends into tubular portions 12, one only being shown.

At their inner ends the shaft sections 10 are supported in a differential gear, the differential gears being represented conventionally at 14—15.

It will be understood that one of the speed changing mechanisms will be associated with the outer end of each shaft section, but as these devices are alike except that certain parts are rights and lefts, one only is illustrated.

The confronting portions of the shaft sections 10 are formed with a plurality of marginal keyways 16 and the hub portions of the differential gear 14 are each provided with keys, indicated at 17, to engage in the keyways. By this means the shaft sections are rigidly attached to the hubs of the differential gearing and rotate therewith.

The hub portion of a main motion transmitting wheel is represented at 18, and mounted for rotation by suitable roller bearings 19 upon the tubular member 12. Extending from the wheel 18 is an annular projection 20 having a ring gear 21 attached to its inner face. Mounted on the tubular member 12 externally of the wheel 18 is a holding member 22, the opening for the shaft being eccentrically disposed therein, as shown.

A bearing ring 23 engages in an annular shoulder in the member 22.

A double gear member including a body 24, outer gear teeth 25, and annular bearing flanges 26 and 27, is arranged within the ring gear with the flange 26 engaging over the bearing ring 23. The outer gear teeth 25 are in constant engagement with the ring gear 21.

Extending from the outer face of the member 22 is a projection 28, and bearing upon the projection and within the outer flange 27 of the double gear 24, is a holding plate 29 being held in place by clamp screws 30 tapped into the projection 28.

By this means the double gear is held in position for rotation upon the member 31.

A pinion 31 slidably engages the shaft 10 and rotates therewith through the medium of internal keys 32 engaging in keyways 33 in the shaft.

The holding member 29 is provided with an opening to permit the pinion 31 to pass when shifted.

Attached to the projection 20 of the wheel 18, by cap screws or studs 34 is a cap or cover member 35 having an internal central socket 36 in which an internal ring gear 37 is secured, the latter adapted to receive the pinion 31 when the latter is moved outwardly.

At its outer end the shaft 10 is journaled in the central portion of the member 35, preferably by a suitable ball bearing, as shown, the pinion 31 and gear 37 constituting a clutch to couple the shaft sections 10 to the wheel 18, and produce a direct rotation of the wheel from the shaft.

Surrounding the shaft 10 between the hub of the differential gear 14 and the pinion 31, is a sleeve 38 having a channeled collar 39 at one end and outturned at the other end to form a flange to receive rivet devices 40 whereby the sleeve is connected rigidly to the pinion.

Mounted in the cover plate for the casing 11 is a rod 41, and slidable on the rod are shifting brackets 42, one of which is shown, each including a forked portion 43 engaging respectively with channeled collars 39.

By this arrangement when the sleeve 38 is disposed in one position, the pinion 31 will be in engagement with the portion of the gear 24 and thus couple the pinions 31 with the gears 24 and thence drive the gear 21 and the wheel 18 and produce the slow speed, and then by shifting the sleeve 38 to its other position the inner sleeves are projected in opposite directions and the pinions 31 will be coupled to the clutch members 37 and apply a direct drive to the wheels.

A bearing adjustment nut 44 is preferably disposed between the holding member 22 and the hub of the wheel 18, as shown.

The improved device will be found very useful and efficient especially in motor trucks, as the direct drive can be employed when speed is required or when running upon level roads, and the indirect drive employed when greater power is required when moving up grades, or over uneven ground.

The device is simple in construction, can be inexpensively manufactured, and operates effectually for the purposes described.

The preferred embodiment of the invention is disclosed in the drawings and set forth in the specification, but it will be understood that any modifications within the scope of the claim may be made in the construction without departing from the principle of the invention or sacrificing any of its advantages.

What is claimed as new is—

A device of the class described comprising a shaft mounted for rotation, an outer sleeve inclosing the shaft, a member rotative on the outer sleeve, an outer ring gear carried by the rotative member, a pinion slidable on the shaft, an inner sleeve connected to the pinion, a holding element carried by the outer sleeve, an inner ring gear rotative on the holding element and having outer teeth engaging the outer ring gear and inner teeth engaging the pinion when the same is in inner position, a clutch element carried by the rotative member and engaged by the pinion when the pinion is in outer position, and means for shifting the inner sleeve to change the position of the pinion.

In testimony whereof, we affix our signatures hereto.

LEO HERMAN.
FRANK J. KARG.